US006928176B2

(12) United States Patent
Lin et al.

(10) Patent No.: US 6,928,176 B2
(45) Date of Patent: Aug. 9, 2005

(54) SWITCHING CIRCUIT BUILT IN IC FOR EARPHONE AND LOUDSPEAKER OF PORTABLE INFORMATION DEVICE

(75) Inventors: Wei Cheng Lin, Taipei (TW); Yung Ming Lee, Kaohsiung (TW)

(73) Assignee: Princeton Technology Corporation, Taipei (TW)

( * ) Notice: Subject to any disclaimer, the term of this patent is extended or adjusted under 35 U.S.C. 154(b) by 255 days.

(21) Appl. No.: 10/436,267

(22) Filed: May 13, 2003

(65) Prior Publication Data

US 2004/0228496 A1 Nov. 18, 2004

(51) Int. Cl.[7] .................................................. H02B 1/00

(52) U.S. Cl. .......................................... 381/123; 381/74

(58) Field of Search ......................... 381/111–117, 123, 381/74, 1, 309; 455/569.1

(56) References Cited

U.S. PATENT DOCUMENTS

| | | | | |
|---|---|---|---|---|
| 4,433,209 A | * | 2/1984 | Kurosawa et al. | 381/1 |
| 5,642,424 A | * | 6/1997 | Masaki | 381/309 |
| 6,397,087 B1 | * | 5/2002 | Kim et al. | 455/569.1 |

* cited by examiner

*Primary Examiner*—Brian Tyrone Pendleton
(74) *Attorney, Agent, or Firm*—Bacon & Thomas PLLC

(57) ABSTRACT

The present creation is to provide a switching circuit built in IC for earphone and loudspeaker of portable information device, and there is no any passive component outside the IC, thus making the circuit board assembly more easily, saving the area of the circuit board, decreasing the volume and the cost. It is very suitable in designing a compact portable information device. In order to avoid any possible logic error during the switching between earphone and loudspeaker, the present creation provides a special unsymmetrical design in differential MOS circuit, and provides a current mirror circuit.

3 Claims, 5 Drawing Sheets

(a)

(b)

SWITCHING CIRCUIT BUILT IN IC FOR EARPHONE AND LOUDSPEAKER OF PORTABLE INFORMATION DEVICE

FIELD OF THE INVENTION

The present invention relates to a switching circuit built in IC for earphone and loudspeaker of portable information device, and more particularly to a switching circuit with the passive components thereof to be built in IC entirely.

BACKGROUND OF THE INVENTION

Conventional switching circuit for earphone and loudspeaker of portable information device is shown in FIG. 1. When a ear phone plug is not inserted into the ear phone jack 1, the audio output Lout is passed through the filter 2 and the switch 11 in the ear phone jack 1 to be fed into the operational amplifier 3 for operating the loudspeaker 4. When the ear phone plug is inserted into the ear phone jack 1 to open the switch 11, the audio output Lout is not fed to the loudspeaker 4, but instead to an earphone.

The operational amplifier 3 is designed into an integrated circuit, while the capacitor 21, the resistor 22 in filter 2 and the input bias resistors 31, 32 of the operational amplifier 3 are still designed by passive components, and arranged outside the IC of the operational amplifier 3. It is tedious to assemble the passive components in this kind of design, and the passive components occupy too much area in a circuit board, therefore increase the cost and volume, and are not suitable in designing a compact portable information device.

OBJECT OF THE INVENTION

It is therefore an object of the present invention to provide a switching circuit built in IC for earphone and loudspeaker of portable information device, and there is no any passive component outside the IC, thus making the circuit board assembly more easily, saving the area of the circuit board, decreasing the volume and the cost. It is very suitable in designing a compact portable information device.

DETAILED DESCRIPTION OF THE INVENTION

Figure 1:
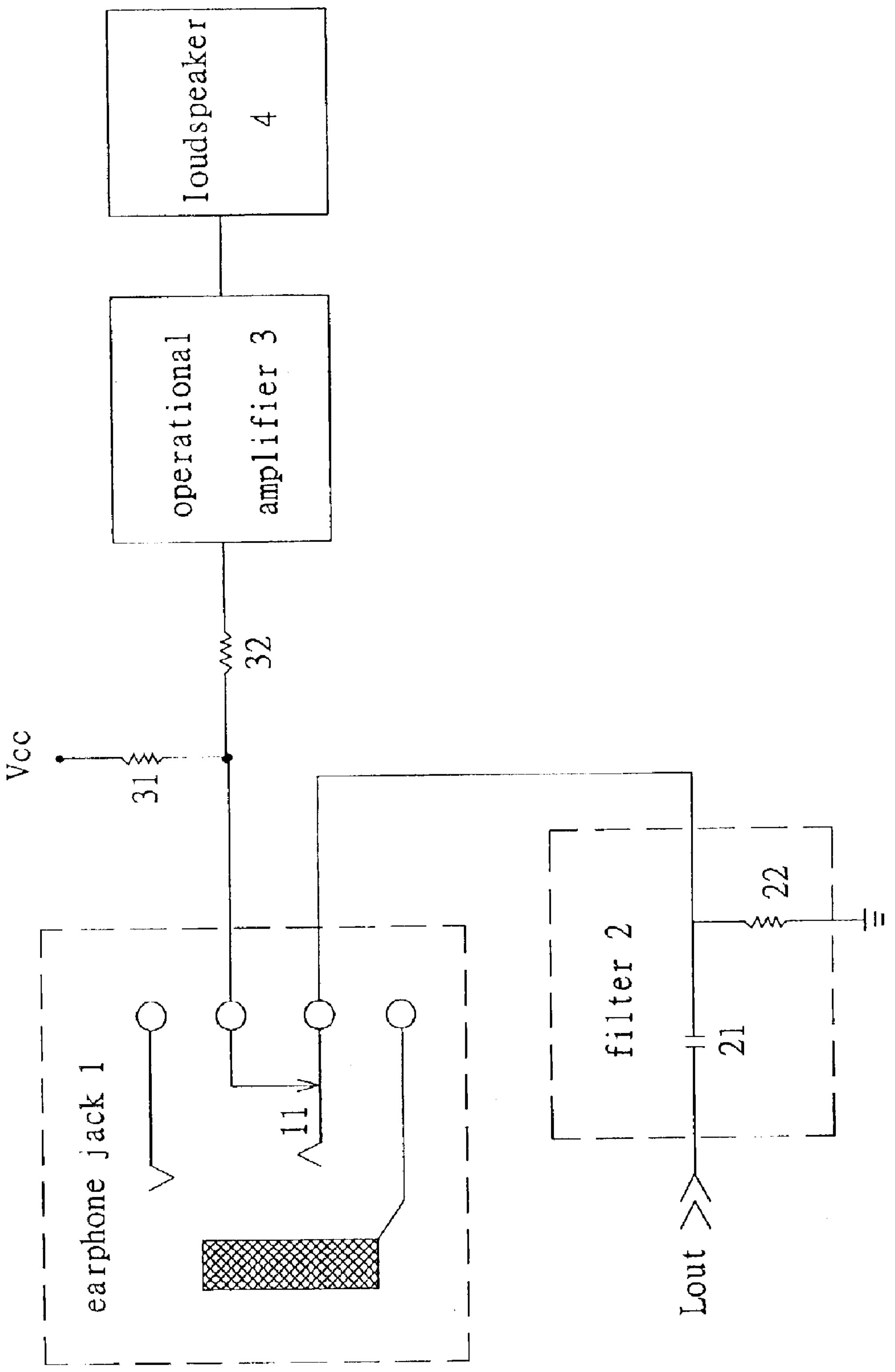
Fig.1 (PRIOR ART)
FIG. 1 shows a conventional switching circuit diagram for earphone and loudspeaker of portable information device.
Figure 2:
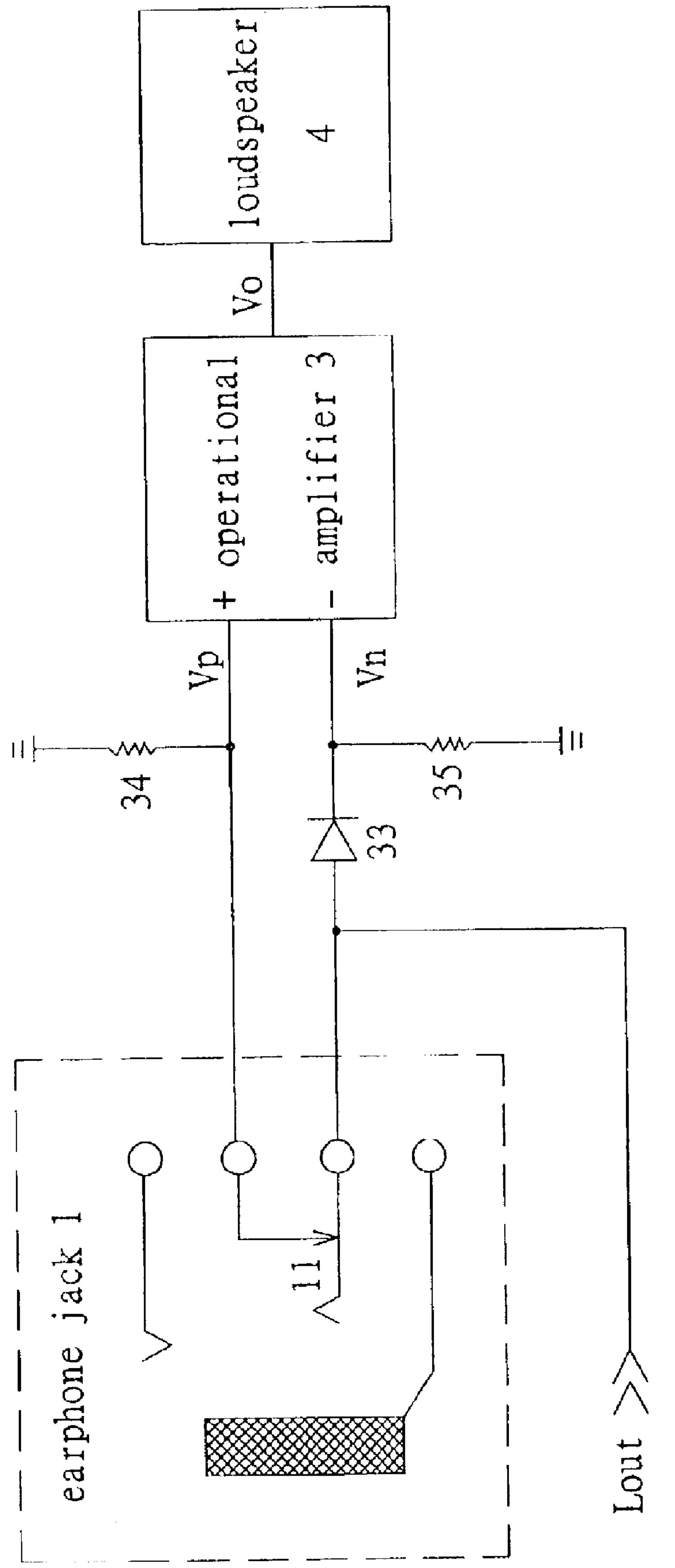
FIG. 2 shows a switching circuit diagram for earphone and loudspeaker of portable information device according to the present invention.

Referring to FIG. 2, the switching circuit built in IC for earphone and loudspeaker of portable information device according to the present invention has no any passive component to be built outside the IC, except the earphone jack 1 and the loudspeaker 4, all other circuits is designed with the operational amplifier 3 to form an IC.

A diode 33, two input bias resistors 34, 35 are designed into the present invention, as shown in FIG. 2.

When a earphone plug is not inserted into the earphone jack 1, the audio output Lout is passed through a switch 11 in the earphone jack 1 to be fed to the positive terminal Vp of the operational amplifier 3, the audio output Lout is also passed through the diode 33 to be fed to the negative terminal Vn of the operational amplifier 3. Since the diode 33 has a voltage drop of 0.7 volt, the voltage of the positive terminal Vp of the operational amplifier 3 is higher than that of the negative terminal Vn, thus the output voltage Vo of the operational amplifier 3 is high to operate the loudspeaker 4.

When a earphone plug is inserted into the earphone jack 1 to open the switch 11, the audio output Lout is fed to the earphone, and the audio output Lout is not fed to the positive terminal Vp of the operational amplifier 3, but is passed through the diode 33 to be fed to the negative terminal Vn of the operational amplifier 3. Since Vp does not accept any audio output, Vp is grounded as shown in FIG. 2, the voltage of the negative terminal Vn is higher than that of the positive terminal Vp. Therefore the output voltage Vo of the operational amplifier 3 is low to unoperate the loudspeaker 4.

Figure 3:
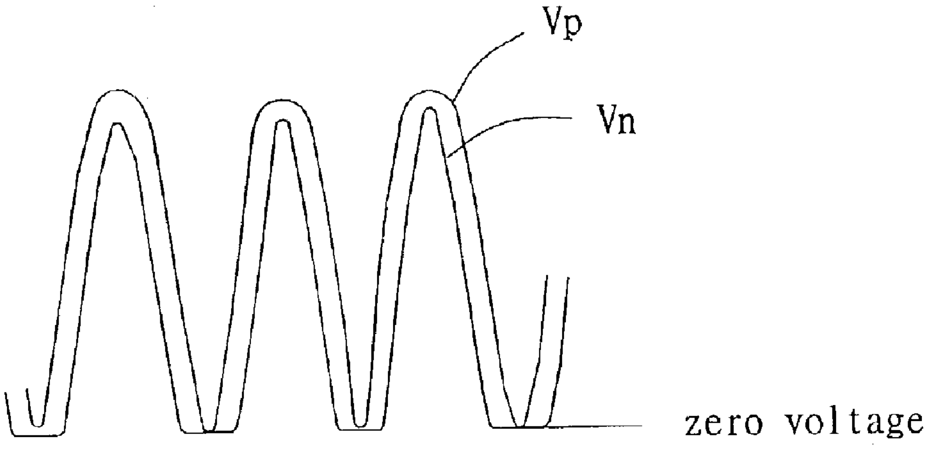
FIG. 3 shows a schematic diagram of voltage Vp and Vn according to the present invention.
Figure 3:
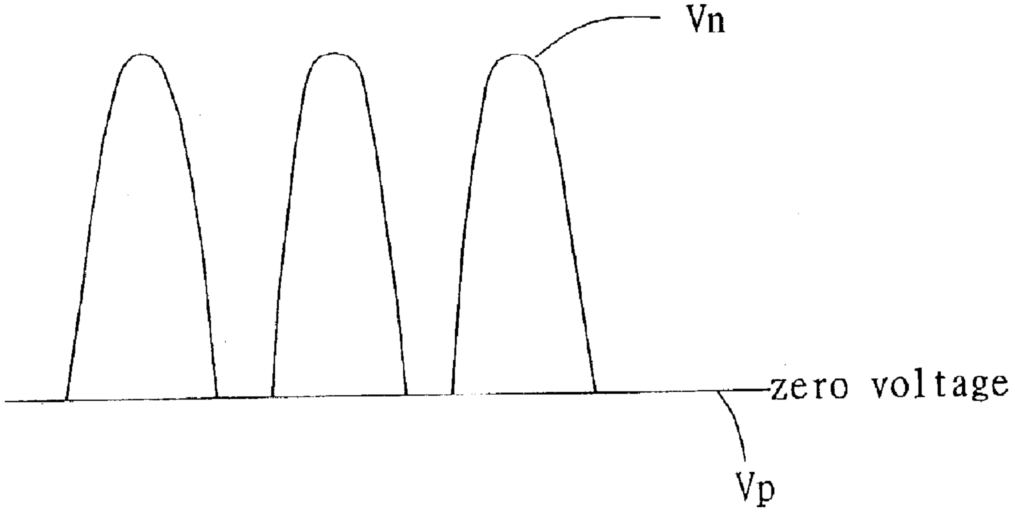

FIG. 3 shows the schematic diagram of voltage $V_p$ and $V_n$ according to the present invention, in which (a) represents a status that the earphone is not inserted into the earphone jack 1 and the loudspeaker 4 is operated; while (b) represents a status that the earphone is inserted into the earphone jack 1 and the loudspeaker 4 is not operated.

In (a), the voltage of Vp (=Lout) is higher than zero volt and the voltage of Vn is lower than that of Vp by 0.7 volt (due to the voltage drop in diode 33). When the voltage of Vp is lower than 0.7 volt, the voltage of Vn will be zero volt, as shown by the horizontal part in (a). This is because of the blockade by the diode 33. Since the voltage of Vp is higher than that of Vn, the output voltage Vo of the operational amplifier 3 is high to operate the loudspeaker 4. However, when the voltage of Vp is equal to zero volt, i.e. Vp=Vn, this will cause trouble that the loudspeaker 4 may be unoperated.

In (b), the voltage of Vp is always a zero volt (because Lout is not fed into the positive terminal Vp of the operational amplifier 3), and the voltage of Vn is higher than zero volt. The voltage of Vn is lower than that of Lout by 0.7 volt (due to the voltage drop in diode 33). When the voltage of Lout is lower than 0.7 volt, the voltage of Vn will be a zero volt, as shown by the horizontal part in (b). This is because of the blockade by the diode 33. Since the voltage of Vn is higher than that of Vp, the output voltage Vo of the operational amplifier 3 is low to unoperate the loudspeaker 4, However, when the voltage of Vn is equal to zero volt, i.e. Vp=Vn, this will cause trouble that the loudspeaker 4 may be operated.

In order to solve the trouble caused by Vp=Vn, the present invention provides two solutions.

Figure 4:
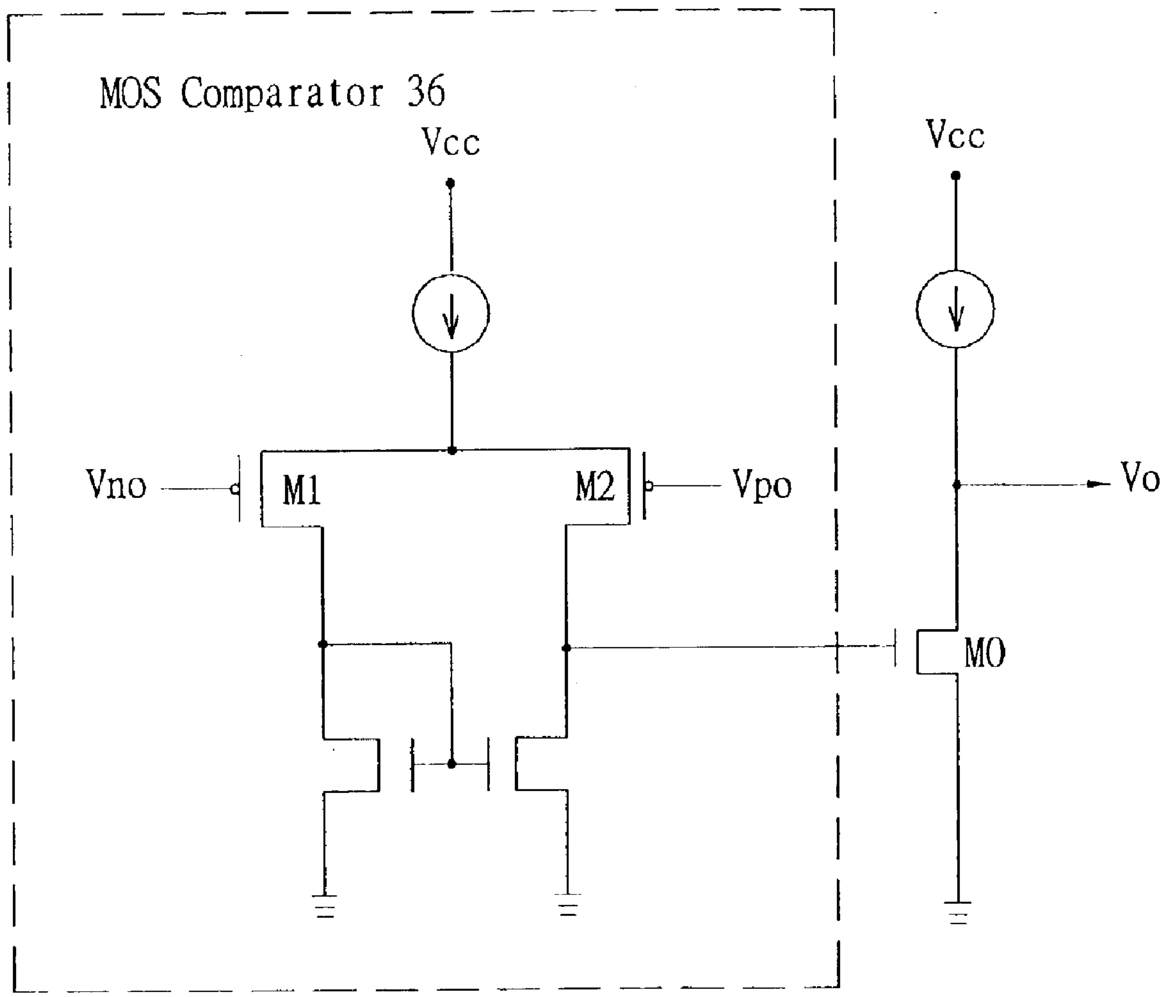
FIG. 4 shows schematically an unsymmetrical circuit design of a MOS comparator in an operational amplifier according to the present invention.

As to the trouble in (a), the present invention provides an unsymmetrical design in a MOS comparator 36 of the operational amplifier 3. Referring to FIG. 4, the MOS comparator 36 of the operational amplifier 3 has PMOS transistors M1 and M2. The input terminal Vno of M1 is connected with Vn by some circuits, while the input terminal Vpo of M2 is connected with Vp by some other circuits. In FIG. 4, there only shows a pair of M1 and M2, but actually there are four PMOS transistors M1 to be parallel connected and four PMOS transistors M2 to be parallel connected. Since the number of M1 is equal to the number of M2, the comparator 36 will present Vpo=Vno when there is no any signal to be fed into the comparator 36. However, The present invention modifies the design by using four PMOS transistors M1 to be parallel connected and "three" PMOS transistors M2 to be parallel connected. Therefore even when there is no any signal to be fed into the comparator 36, Vpo=Vno+0.15 volt. When Vp=Vn=zero volt in FIG. 3, Vpo is not equal to Vno, but higher than Vno by 0.15 volt. Consequently, the loudspeaker 4 will not be unoperated. The output of M0 in FIG. 4 is the output Vo of the operational amplifier 3.

Figure 5:
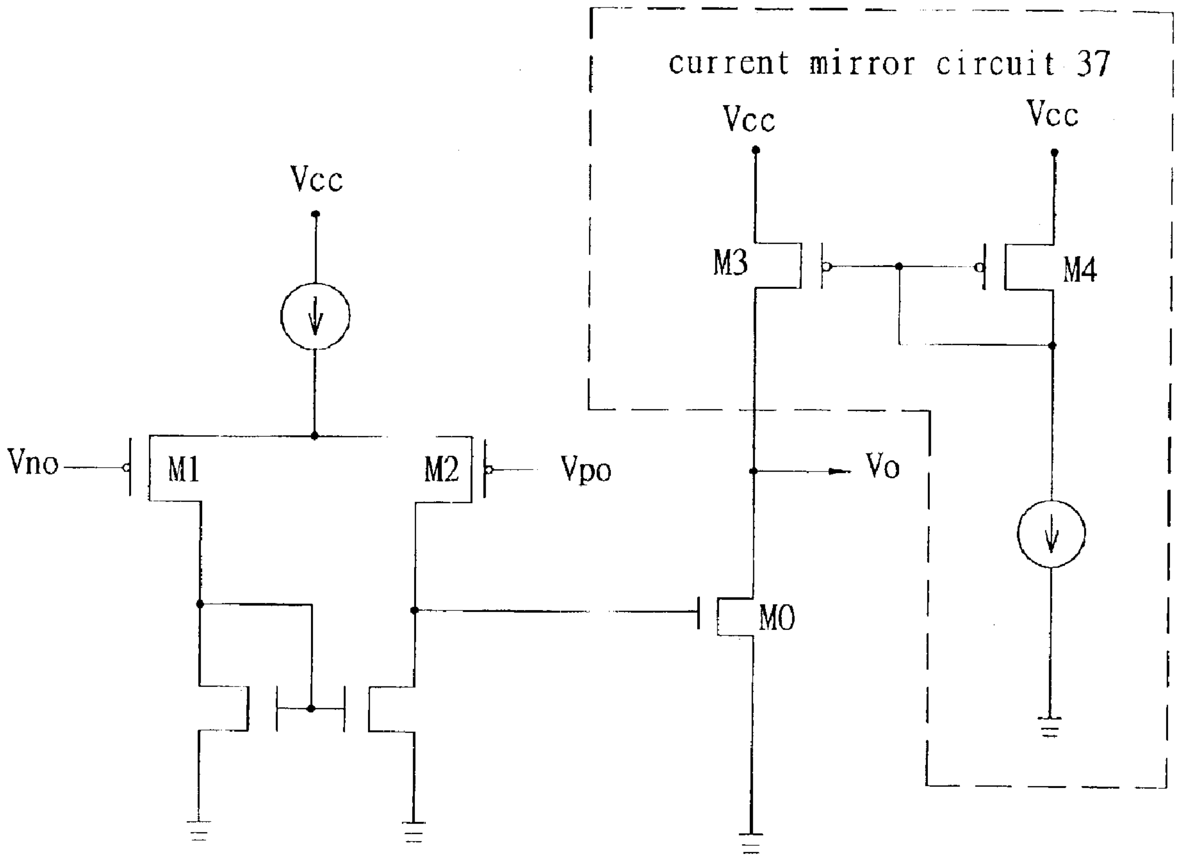
FIG. 5 shows schematically a current mirror circuit added beside the MOS comparator in an operational amplifier according to the present invention.

As to the trouble in (b), the present invention provides a current mirror circuit 37 beside the comparator 36 of the operational amplifier 3. Referring to FIG. 5, PMOS transistors M3 and M4 are connected as shown. M3 represents only one PMOS, while M4 represents three PMOS to be parallel connected. In accordance with the property of the current mirror circuit, the current $I_{M3}$ in M3 is equal to ⅓ of the current $I_{M4}$ in M4. Therefore, the driving current for the output Vo of the operational amplifier 3 is ⅓ of the original design. A small driving current will cause the slew rate of the comparator 36 more slow. Therefore, when Vp=Vn in (b) is encountered, the trouble that the loudspeaker 4 may be operated is solved because the operational amplifier 3 cannot change status immediately due to the slow slew rate of the comparator 36, and the loudspeaker 4 is not operated.

The spirit and scope of the present invention depends only upon the following claims, and is not limited by the above embodiment.

What is claimed is:

1. A switching circuit built in IC for earphone and loudspeaker of portable information device, comprising a ear phone jack, a diode, two input bias resistors, and an operational amplifier;

one terminal of each of said two input bias resistors is connected respectively with a positive terminal and a negative terminal of said operational amplifier, the other terminal of each of said two input bias resistors is connected with the ground;

an output of said operational amplifier is used for driving a loudspeaker;

excepting said ear phone jack and said loudspeaker, said diode, said two input bias resistors and said operational amplifier are designed integrally to form an IC;

when a earphone plug is not inserted into said earphone jack, an audio output is passed through a switch in said earphone jack to be fed to said positive terminal of said operational amplifier, said audio output is also passed through said diode to be fed to said negative terminal of said operational amplifier;

when said earphone plug is inserted into said earphone jack to open said switch, said audio output is fed to an earphone, and said audio output is not fed to said positive terminal of said operational amplifier, but is passed through said diode to be fed to said negative terminal of said operational amplifier.

2. A switching circuit built in IC for earphone and loudspeaker of portable information device according to claim 1, wherein said operational amplifier includes a comparator, said comparator has several transistors MOS1 being parallel connected and several other transistor MOS2 being parallel connected; an input of said transistors MOS1 is connected through some circuits with said positive terminal of said operational amplifier, and an input of said other transistors MOS2 is connected through some other circuits with said negative terminal of said operational amplifier; the number of said transistors MOS1 is different from the the number of said other transistors MOS2.

3. A switching circuit built in IC for earphone and loudspeaker of portable information device according to claim 1, wherein said operational amplifier includes a comparator, a current mirror circuit is added beside said comparator, one MOS transistor and two or more other parallel connected MOS transistors are opposite with each other to form said current mirror circuit, therefore the current in said one MOS transistor is lower than that of said two or more other parallel connected MOS transistors, and said current in said one MOS transistor is used for driving said output of said operational amplifier.

* * * * *